United States Patent [19]

Linford

[11] Patent Number: 4,742,522
[45] Date of Patent: May 3, 1988

[54] FREE-ELECTRON LASER SYSTEM WITH RAMAN AMPLIFIER OUTCOUPLING

[75] Inventor: Gary J. Linford, Torrance, Calif.

[73] Assignee: TRW Inc., Redondo Beach, Calif.

[21] Appl. No.: 63,375

[22] Filed: Jun. 18, 1987

[51] Int. Cl.$^4$ .............................................. H01S 3/00
[52] U.S. Cl. ........................................ 372/2; 372/18;
372/69; 372/95; 372/101; 372/107; 372/108
[58] Field of Search .................. 372/2, 18, 69, 70, 98,
372/99, 94, 29, 95, 101, 107, 108

Primary Examiner—Leon Scott, Jr.
Attorney, Agent, or Firm—Noel F. Heal; Thomas N. Giaccherini

[57] ABSTRACT

Apparatus and a related method for controlling the characteristics of a high-power laser beam to provide a desired beam divergence, spectral content, and phase. A high-power beam, as from a free-electron laser, is directed into a conical Raman amplifier, together with a Stokes seed beam having the desired characteristics. The amplified output from the amplifier is divergent and its intensity falls of rapidly enough to allow the use of solid material optics without damage or destruction of the optical elements. The Raman amplifier is contained in part by two moving-gas windows, which seal the amplifier from the vacuum environment of the laser without the use of solid material optics. In one embodiment of the apparatus, the resulting output beam is precorrected for phase aberrations caused by optical elements and the transmission medium through which the beam is directed. Pre-correction of the aberrations is achieved by passing the low-power seed beam through substantially the same path as the high-power beam, during an input cycle; then phase-conjugating the seed beam and injecting it into the amplifier at the same time as an output pulse from the laser. The same principle is applied in another embodiment to produce a phase-coherent composite output from multiple high-power lasers.

21 Claims, 13 Drawing Sheets

FREE-ELECTRON LASER SYSTEM WITH RAMAN AMPLIFIER OUTCOUPLING

BACKGROUND OF THE INVENTION

This invention relates generally to high-power lasers and, more particularly, to free-electron lasers. A free-electron laser produces a small-diameter, parallel, diffraction-limited, optical beam of such high intensity that there is a practical difficulty in focusing and reflecting the beam.

By way of background, a free-electron laser generates coherent light when bunches of free electrons, accelerated to near relativistic velocities, i.e. near light speed, are passed through a spatially alternating magnetic field known as a wiggler. Considerable energy is required to accelerate the electrons to near light speed, and the overall efficiency of such a system is typically only a few percent. Basically, a free-electron laser has two principal components: the laser itself, in which some of the energy of the electrons is converted into light energy, and an electron acceleration system. The present invention is not directly concerned with either of these components, but relates to improvements in practical techniques for handling a high-power beam outcoupled from such a laser, or from multiple lasers of the same type.

Optical lenses, mirrors and windows made from conventional materials are subject to damage or destruction from a high-power free-electron laser (FEL) beam. A common solution to this problem is to locate optical mirrors a large distance from the laser gain region from which the beam is emitted. Over a long distance, perhaps tens or hundreds of meters, the output beam diffracts, broadens, and loses intensity. Location of the optical components at such large physical spacings poses significant problems of beam alignment and mechanical design. The problem is aggravated by the presence, in the beam, of output components at harmonic frequencies in addition to the fundamental frequency. Although their initial intensities are less than that of the fundamental component, these harmonic components may have a total power of about one percent of the total beam power. Moreover, the higher harmonics suffer less diffraction and can still cause serious damage to remotely located optical components.

The interaction between relativistic electrons and the alternating magnetic field takes place in a vacuum in the FEL. Consequently, the first problem facing the designer of a FEL system is how to seal this vacuum and provide a window for output of the outcoupled beam. A window of conventional optical materials positioned close to the laser gain region would be destroyed in a high-power system. The solution commonly proposed is to contain the entire optical system within a vacuum until the beam is sufficiently broadened to permit reflection by suitably cooled mirrors and windows.

There are, therefore, two basic problems associated with FELs of high power. The first is that there has been no practical technique for conveniently handling high-power output beams from FELs without the use of very widely spaced optical components. The second, and related problem is that harmonic components of the laser output are even more difficult to handle with conventional optics, since they are less subject to diffraction. The present invention is directed to a solution to both of these problems. A third category of problems relates to the correction of laser beams for wavefront distortions caused by passage through optical components or through a transmission medium. Although solutions have been proposed using phase conjugation techniques for this purpose, there is an inherent difficulty in applying these techniques to FEL beams, because of their extremely high power. The present invention permits single or multiple beams to be conveniently corrected for wavefront distortions caused by passage of the beam through optical components or through a transmission medium. A further advantage is that medical applications of FELs are greatly enhanced by the compact nature of the optical system of the invention, and by the capability of separately outcoupling harmonics of the FEL fundamental.

SUMMARY OF THE INVENTION

The present invention in its broadest form resides in the use of a conical Raman amplifier to provide outcoupling and beam expansion for the output of a free-electron laser. Briefly, and in general terms, the invention in this form comprises a free-electron laser pump beam generator producing a high-power optical output beam in a vacuum environment, a Raman amplifier cell located in the path of the output beam from the pump beam generator, and means for introducing a Stokes seed beam into the Raman amplifier cell, the seed beam having divergent properties within the cell and a desired spectral content. The Raman amplifier amplifies the seed beam and generates a high-power output beam of generally the same shape, divergence, phase and spectral content as the seed beam. Unwanted spectral components are unaffected by the amplifier and are closely confined to the pump beam axis. The apparatus of the invention also includes a pair of gaseous windows through which the output beam enters and leaves the Raman amplifier cell, each window having a stream of gas moving continuously in a direction generally perpendicular to the beam, and a mirror positioned in the path of the output beam from the Raman amplifier, the mirror functioning to reflect and further direct the output beam, and having an aperture for passage of the unwanted spectral components.

In its simplest form, the apparatus of the invention is employed to outcouple light from a single free-electron laser. Beam expansion is effected in the Raman amplifier, and then the mirror, which may still need to be cooled, separates out the unwanted harmonic content of the output beam and reflects the desired beam to another mirror or to a target.

In accordance with another aspect of the invention, the Raman amplifier is also employed as a convenient device for compensating for wavefront aberrations in the output beam. For this purpose, the apparatus is operated alternately in two cycles: a seed input cycle and a conversion output cycle. In the seed input cycle, the free-electron laser is between output pulses and a low-power seed beam is input to the Raman amplifier along practically the same optical path that will be followed by the high-power output beam from the apparatus. In particular, the low-power seed beam is subject to the same aberrations that the high-power beam will be subject to. The apparatus includes a phase conjugation cell into which the low-power seed beam is directed. The phase conjugation cell generates a return seed beam that is the phase conjugate of the incoming seed beam, and this phase conjugate return seed beam reaches the Raman amplifier at the time that a pumping pulse from the free-electron laser arrives for the conversion output cycle. The low-power return seed beam controls the nature of the amplified output from the Raman amplifier, which therefore produces a high-power beam having the same phase properties as the return seed beam. Thus, as the high-power output beam traverses the same optical path as the low-power seed beam, the output beam emerges as a near-perfect diffraction-limited beam, since it has been pre-corrected for phase aberrations. Of course, the low-power seed beam and the high-power output beam cannot traverse exactly equivalent optical paths, and means must be provided to offset their paths slightly to permit separation of the two.

In accordance with another aspect of the invention, the concept of combining Raman amplification with phase conjugation is extended to a system in which multiple free-electron lasers are integrated into a single system. Such a system includes multiple lasers, multiple Raman amplifiers, and an array of multiple mirrors, together with a single seed beam master oscillator, a single phase conjugation cell, and optical means for directing the seed beam over multiple paths that traverse the multiple mirrors and Raman amplifiers. The seed beam provides control of the divergence, spectral content and phase of the composite output beam from the system. Moreover, since the seed beams are subject to the same aberrational influences as the high-power output beams, the latter are pre-corrected for these aberrations and the single phase conjugation cell provides for the coherent coupling of the multiple beams.

It will be appreciated from the foregoing that the present invention represents a significant advance in the field of high-power laser systems, such as free-electron lasers. In particular, the invention provides a convenient technique for outcoupling light from a free-electron laser without having to rely on diffraction over long distances. When the Raman amplifier approach of the invention is combined with phase conjugation for the correction of wavefront aberrations, the invention provides a solution to the problem of phase conjugation of powerful FEL beams, either singly or in arrays. Other aspects and advantages of the invention will become apparent from the following more detailed description, taken in conjunction with the accompanying drawings.

DESCRIPTION OF THE PREFERRED EMBODIMENTS

Figure 1:
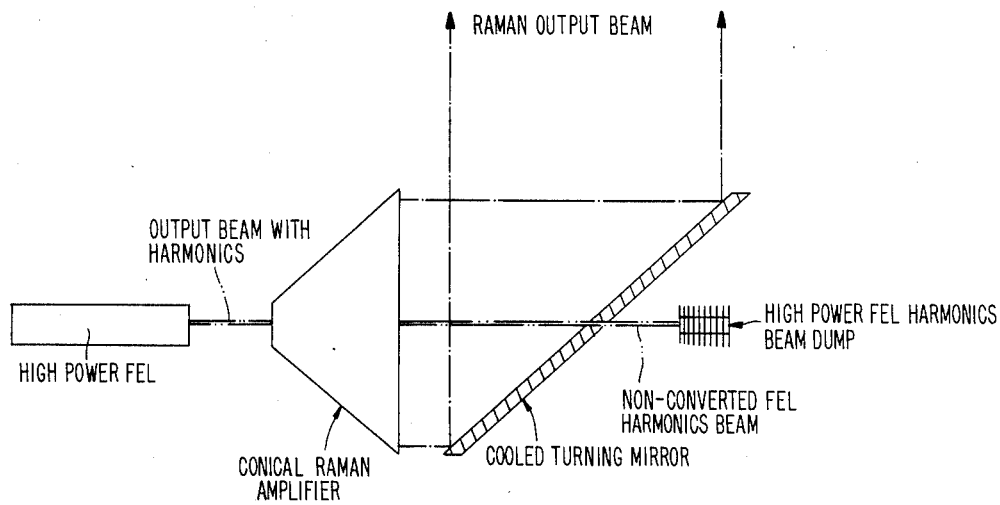
FIG. 1 is a schematic diagram of a free-electron laser system incorporating the Raman amplifier technique of the invention to provide output beam divergence and elimination of unwanted harmonics.

As shown in the drawings for purposes of illustration, the present invention is concerned with techniques for the output and combination of single or multiple high-power laser beams, such as free-electron laser beams. Free-electron laser (FEL) beams can be so powerful that they present special problems of containment, focusing, reflection and combination. In the past, large optical element spacings have been employed to make use of beam diffraction over long distances, and to thereby minimize damage to optical elements. This approach not only poses design problems and inaccuracies, but it also has very little effect on significant output components at harmonic frequencies.

In accordance with the present invention, an FEL output beam is expanded to an appropriate diameter, and to a correspondingly reduced intensity, in a very compact apparatus which also accomplishes separation of undesired spectral components of the beam.

The basic components of the apparatus are shown in FIG. 1 as including a high-power free-electron laser (FEL), indicated by reference numeral 10, a conical Raman amplifier 12, and a cooled turning mirror 14 having a central aperture 16. The FEL 10 produces a small-diameter, extremely intense output beam, indicated at 18, which is input to the Raman amplifier 12. A powerful output beam 20 emanates from the amplifier 12 and, as will be further explained, beam properties such as the divergence, spectral content and phase of the output beam 20 can be controlled by means of an input seed beam, referred to as the Stokes seed beam, supplied to the Raman amplifier. Thus, if the seed beam is selected to have an appropriate divergence angle, the output beam 20 will also have the desired divergence angle. The resulting diverging output beam can then be turned by the mirror 14, and further controlled as desired for a particular application. Moreover, if the seed beam applied to the Raman amplifier 12 contains no harmonics, then the harmonic components of the laser beams 18 will be unaffected by the amplifier and will remain as a very small diameter beam 18' emerging from the amplifier. Therefore, the unwanted spectral components can be readily separated out from the main beam 20 by means of the aperture 16 in the mirror 14.

Figure 2:
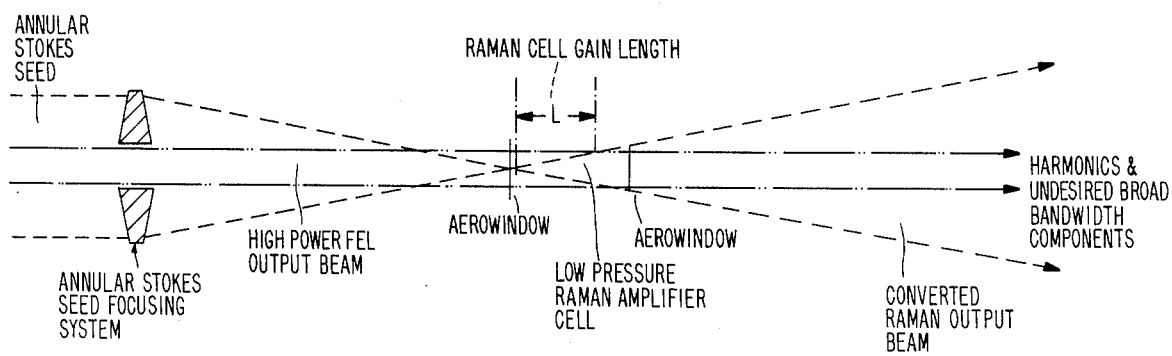
FIG. 2 is a schematic diagram of the Raman amplifier and related optics used in the system of FIG. 1.

FIG. 2 shows in more detail how the apparatus of FIG. 1 is implemented. The apparatus includes an annular seed focusing system 21, here shown as a convex lens having a central aperture 22 through which the FEL output beam 18 passes. The seed beam is indicated at 24 as a collimated beam, before it passes through the seed beam focusing system 21, after which the seed beam 20 converges to a focal point near the entrance to the Raman amplifier 12. Then the seed beam diverges again. The seed beam 24 is selected to have an appropriate frequency close to the fundamental frequency of the laser output beam 18, and to have a convergence/divergence angle to satisfy the intensity requirements of the mirror 14. In the Raman amplifier, the seed beam is highly amplified, and emerges as the output beam 20, having the same divergence, phase and spectral properties as the seed beam 24. The harmonic or other undesired spectral components of the original laser output beam 18 are unaffected by the Raman amplifier process, and emerge from the amplifier 12 as the beam 18'.

The Raman amplifier 12 operates on the principle of stimulated Raman scattering of light. When an intense beam of light traverses a suitable medium, which may be a gas, a liquid or a solid, weak light scattered from the molecules of the medium is amplified by several orders of magnitude due to the high incoming photon flux. The generation of stimulated Raman light is accompanied by intense molecular or lattice vibrations, which modulate the incoming light beam. The underlying principles relating to Raman amplifiers are well known and have been widely discussed in the technical literature. For example, a technical survey of the principles of stimulated light scattering, including Raman scattering, can be found in Volume 2, Chapter E2 of the text entitled "Laser Handbook," edited by F. T. Arecchi and E. O. Schulz-DuBois, published by North-Holland Publ. Co., 1972.

In a Raman amplifier, if a seed beam, known as the Stokes beam, is input to the amplifier cell at a frequency suitably shifted from that of a high-power beam, then the high-power beam is converted to the frequency and other characteristics of the seed beam. Looked at from another standpoint, the seed beam may be thought of as being amplified in the Raman cell. The interesting characteristic of this type of amplification is that, so long as the frequency of the seed beam is selected to be the so-called Stokes frequency, which is somewhat red-shifted from the high-power beam, and if the Stokes seed is correlated with the FEL pump beam, then the output beam will be a high-power replica of the seed beam, in terms of phase, divergence or convergence, cross-sectional geometry, and spectral content. In the specific amplifier 12 of the invention, the seed beam is selected to have a divergence as it enters the interaction region of the amplifier. Consequently, the output beam 20 will also diverge, and will therefore have its intensity lowered in a relatively short distance. Because of the rapid divergence of the beam, the apparatus is compact, compared to the large spacings required for devices that employ diffraction to reduce the beam intensity.

Figure 15:
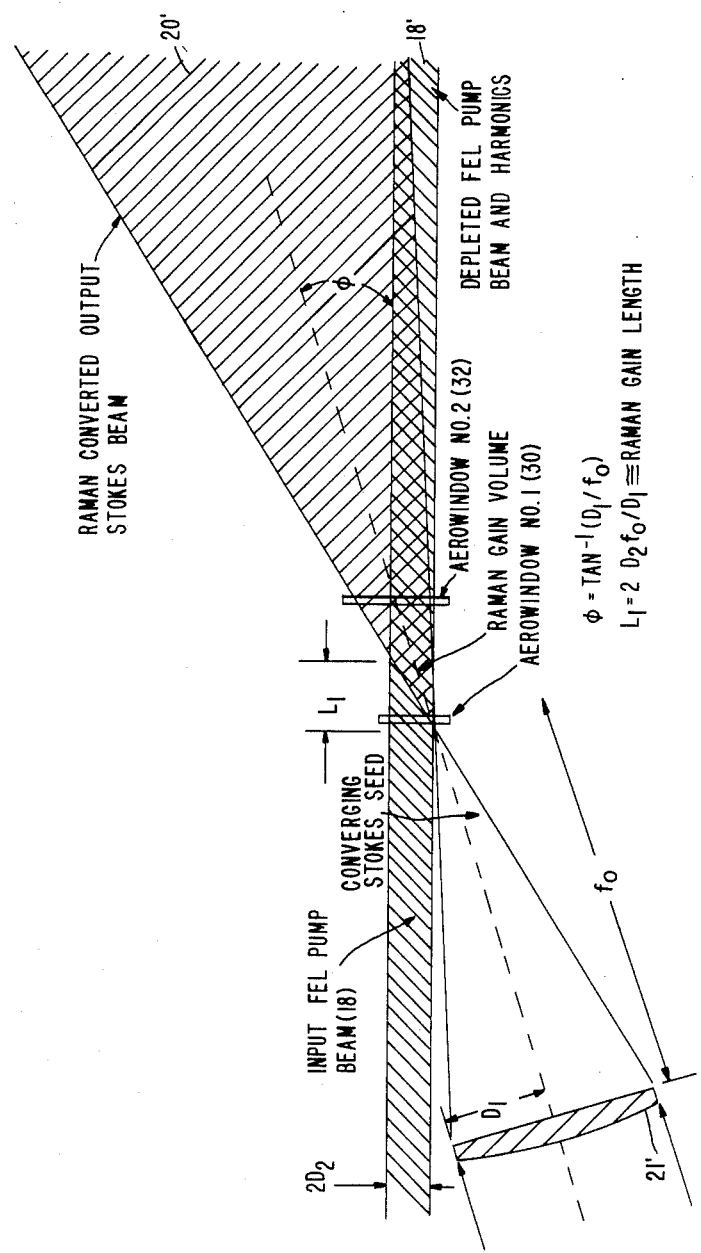
FIG. 15 is a schematic diagram showing details of an abaxial conical Raman FEL converter configuration.

Another advantage of the invention derived from the use of the Raman amplifier is that the harmonic content of the laser output can be completely eliminated, if desired. If the seed beam has no harmonic content, the harmonic content of the laser beam 18 will be totally unaffected by the amplifier 12, and will remain tightly bunched at the optical axis of the system. This permits separation of the harmonic components by "scraping" them off through an annular optical component. Other geometrical configurations are possible, of course, such as having the seed beam introduced into the amplifier in a skewed relationship to the optical axis of the apparatus. An example is shown in FIG. 15. The remaining harmonic components can then be arranged to completely bypass the next turning mirror in the system.

The FEL 10 must operate in a vacuum, but the Raman amplifier 12 of the presently preferred embodiment of the invention employs hydrogen gas as the Raman gain medium. Since the laser beam 18 is of extremely high intensity at the point where it is introduced into the amplifier, solid optical windows cannot be used to separate the amplifier 12 from the surrounding vacuum environment. The disclosed embodiment of the invention employs aerowindows 30 and 32 for this purpose. Each aerowindow includes a layer of rapidly moving hydrogen gas, the movement being generally perpendicular to the laser beam. The use of gaseous windows of this general type has been known for some years. Although some of the gas is lost to the vacuum environment, the velocity of the gas maintains the integrity of the vacuum seal and, in this case, of the Raman amplifier 12.

The amplifier 12 is preferably operated at very low pressure. This ensures that the optical gain process taking place in the amplifier will be dominated by rotational Raman scattering, which provides some significant advantages over vibrational Raman scattering. Rotational scattering results in less heating in the amplifier and is potentially more efficient than vibrational scattering. Further, since rotational scattering dominates at very low pressures, this is consistent with the vacuum environment in which the system operates, and facilitates the implementation of the aerowindows for sealing of the amplifier.

Another advantage of the Raman amplifier for control of the output of a FEL is that the intensity of the output beam can also be controlled in the amplifier. The mechanism for this is the pressure of the hydrogen gas medium in which the amplification takes place. By varying the pressure, the gain of the amplifier can be controlled, and hence the output beam intensity. A further advantage is that one may choose to operate the system in a manner that makes use of the harmonic components rather than simply dumping them. For example, the harmonics can be selectively outcoupled in separate Raman cells from the original high-power laser beam, thus providing the capability of generating multiple beams with selected high-frequency components. Such beams can be used for identification in various applications, or for medical or scientific applications for which the short wavelength laser light fulfills specialized requirements.

Because the Raman amplifier permits the properties of a high-power output beam to be controlled by a low-power seed beam, this principle may be extended to a system in which the phase of the output beam is controlled by a seed beam. More specifically, phase aberrations in the high-power beam can be pre-corrected by injecting a suitable compensated seed beam into the Raman amplifier. For this purpose, it should be noted that free-electron lasers operate in pulsed modes. During the time intervals when the pump laser pulses are elsewhere, a seed beam passes through the same optical elements and transmission medium that will be encountered subsequently by the high-power beam. Since no pumping pulse is simultaneously present in the Raman cell 12, no amplification occurs during these time intervals. The low-power seed beam is then focused into a phase conjugation cell, which generates a return seed beam containing all of the phase information needed to compensate for the aberrational influences of the optical elements and transmission medium. Operation of the pulsed free-electron laser is timed to produce a high-power pumping pulse that arrives at the Raman amplifier at the same time as the return seed beam, thereby producing a high optical gain for the seed. Thus the amplifier generates a high-power output beam with all of the phase properties of the return seed beam, and the output beam is thereby pre-corrected for the aberrations that would otherwise be introduced as the beam passes through the optical elements and the transmission medium.

Figure 3:
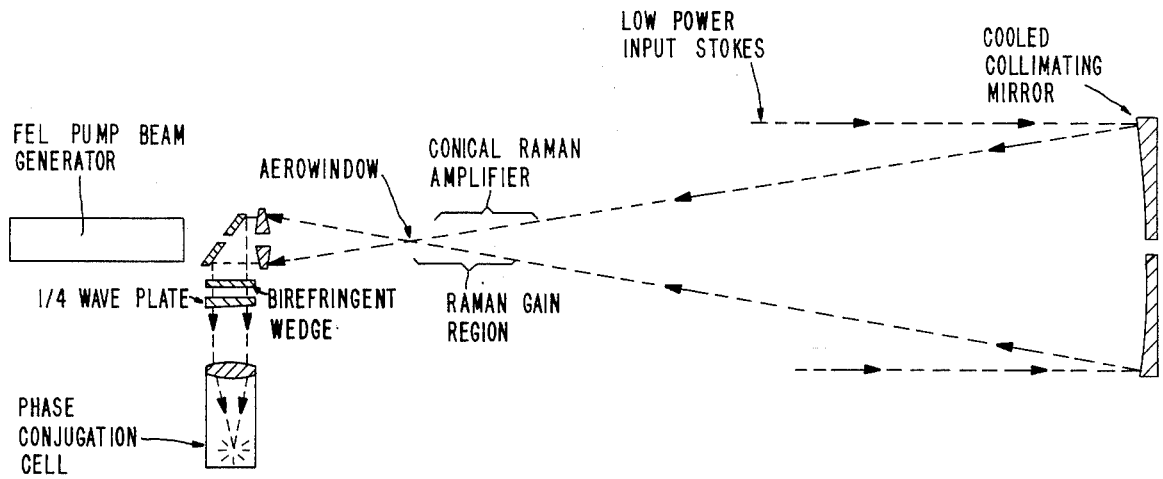
FIG. 3 is a schematic diagram of a free-electron laser system in accordance with the invention, having a phase conjugation cell for pre-correction of phase aberrations, and showing optical ray paths during a seed input cycle.
Figure 4:
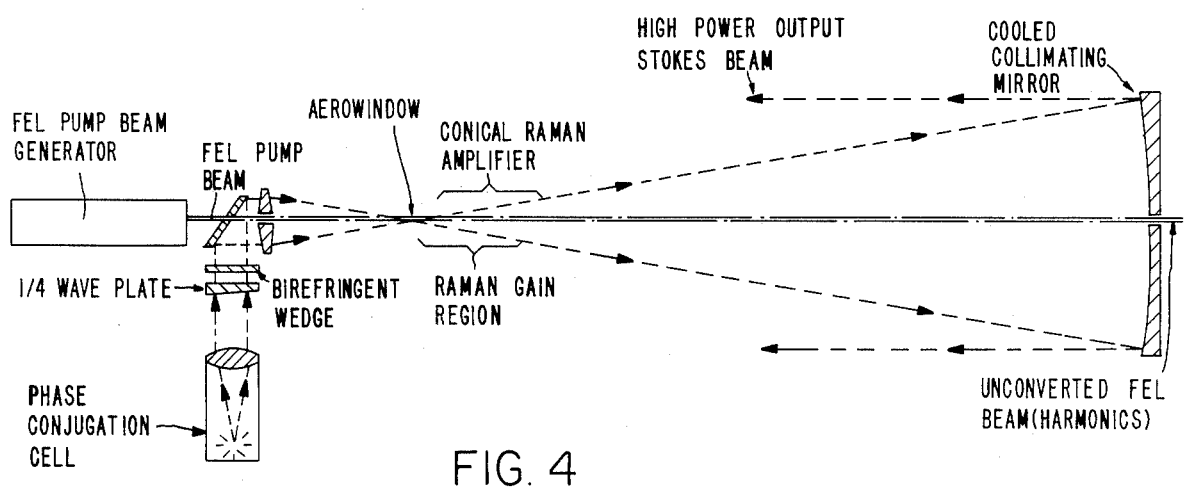
FIG. 4 is a schematic diagram similar to FIG. 3, but showing optical ray paths during a conversion output cycle.

The elements of the system described generally above are shown with more specificity in FIGS. 3 and 4, including a free-electron laser 10', a conical Raman amplifier 12' and a cooled collimating mirror 14'. Also included are an annular seed beam focusing lens 21', a phase conjugation cell 40, a quarter-wave plate 42, a birefringent wedge 44, and an annular mirror 46 positioned between the laser 10' and the lens 21'. During the seed input cycle, as shown in FIG. 3, the seed beam, indicated at 24', traverses practically the same path that will be followed by the high-power beam 20' on output from the apparatus, but in the reverse direction. The seed beam 24' passes through the conical Raman amplifier 12', through the lens 20', and is reflected from the mirror 46, after which the seed beam passes through the quarter-wave plate 42 and birefringent wedge 44, and is focused by an additional lens 48 into the phase conjugation cell 40.

It has been known for some time that phase conjugation of light waves can be used to remove phase aberrations caused by the passage of a light beam through a distorting or phase-aberrating medium. There is extensive literature on the subject of phase conjugate optics and the use of phase conjugation for the compensation of phase aberrations. A summary of the history and principles of phase conjugate optics is provided in a paper entitled "Phase Conjugate Optics and Real-Time Holography," by Amnon Yariv, IEEE Journal of Quantum Electronics, Vol. QE-14, No. 9, September, 1978, pp. 650-60.

Simply stated, a phase conjugation cell functions as a reflector with a special and useful property. When an incident light wave is focused into the cell, the reflected wave that emerges is the complex conjugate of the incident wave. The practical consequence of the phase conjugation is that the retroreflected wave is as if it were "time-reversed" with respect to the incident wave. For example, if an incident wave, after passing through a distorting medium, has a bulge in its wavefront, representing a phase-lagging condition at a particular region of the front, this will be reflected as an opposite bulge, i.e. a phase lead, in the same region of the reflected wavefront. If the reflected wavefront then traverses the same distorting medium that caused the original bulge in the incident wavefront, the reflected wave will emerge from the distorting medium as an undistorted wave.

Phase conjugation can be accomplished using any of a number of alternative techniques, among them being stimulated Brillouin scattering (SBS) and four-wave mixing (FWM). These are explained in more detail in the Yariv paper cited in the background section of this specification. The particular technique employed for phase conjugation is not critical to the invention, as will become apparent as the description proceeds.

It will be appreciated that the apparatus of FIGS. 3 and 4 can be employed to generate a phase-compensated high-power beam, by compensating the seed beam of the Raman amplifier 12'. The seed beam contains all of the phase information necessary to effect such a compensation. The seed beam is then phase conjugated in the phase conjugation cell 40, and is injected into the Raman amplifier 12' at exactly the same time as the next output pulse from the free-electron laser 10'. Therefore, the amplified output beam from the Raman amplifier 12' will be phase-corrected for aberrations it will encounter on its journey through the optical elements and the transmission medium. In effect, the output beam will start out by being phase distorted, but the beam quality will continuously improve the wavefront progresses through the various optical elements and through the aberration-inducing transmission medium. Ideally, the output beam will complete its journey with perfect wavefront shape. In practice, of course, the aberrational influences encountered by the high-power output beam are never exactly the same as the influences encountered by the low-power seed beam. Moreover, the two optical paths traversed by the seed beam and the high-power beam cannot be identical in all respects. In fact, it is the purpose of the quarter-wave plate 42 and the birefringent wedge 44 to ensure that the paths do not exactly overlap. The birefringent wedge 44 is sensitive to the direction of linear polarization of the beam passing through it. Specifically, the wedge deflects the beam through a small angle, the magnitude of which depends on the polarization. After passing through the wedge 44, the seed beam passes through the quarter-wave plate 42, which has the effect of converting the polarization of the beam from linear to circular.

The return seed beam retraces the path of the original seed beam, but with one important exception. On encountering the quarter-wave plate 42, the circularly polarized reflected beam will be converted to linear polarization of the opposite type to that of the seed beam before it first encountered the quarter-wave plate. In other words, the two passes through the quarter-wave plate 42 result in the direction of linear polarization being rotated by ninety degrees. As a result, the return seed beam is deflected through a slightly different angle by the birefringent wedge 44, and eventually the high-power output beam emerges from the apparatus along a path that diverges from the input path along which the seed beam is first introduced.

From the foregoing description of FIGS. 3 and 4, it will be apparent that the principle of the invention permits phase conjugation to be applied to high-power free-electron laser systems for the first time. Thus a high-power free-electron laser system can be pre-compensated for phase aberrations caused in optical elements and in the transmission medium, such as the atmosphere. At the same time, the apparatus of the invention permits the outcoupling of high-power beams without the need for large distances to enlarge the beam by diffraction, since an expanded beam of reduced intensity can be obtained using the conical Raman amplifier as an outcoupling mechanism in accordance with the invention. Medical applications of the invention are greatly enhanced by the compact nature of the optical system and by the capability of separately outcoupling harmonics of the FEL fundamental.

Figure 5:
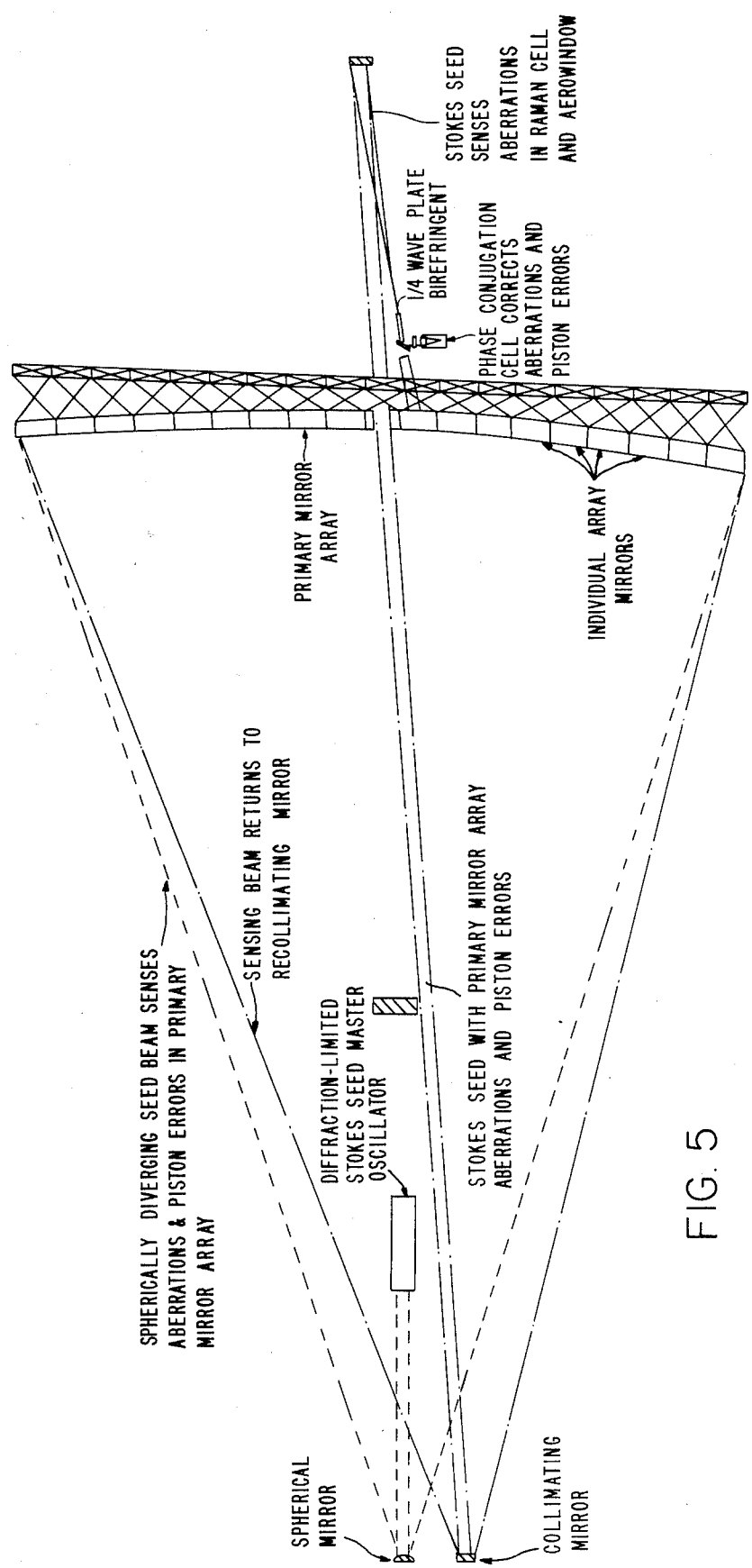
FIG. 5 is a fragmentary schematic diagram of an FEL array using Raman amplifiers and phase conjugation for the correction of phase errors, and showing optical ray paths during the seed input cycle.
Figure 6:
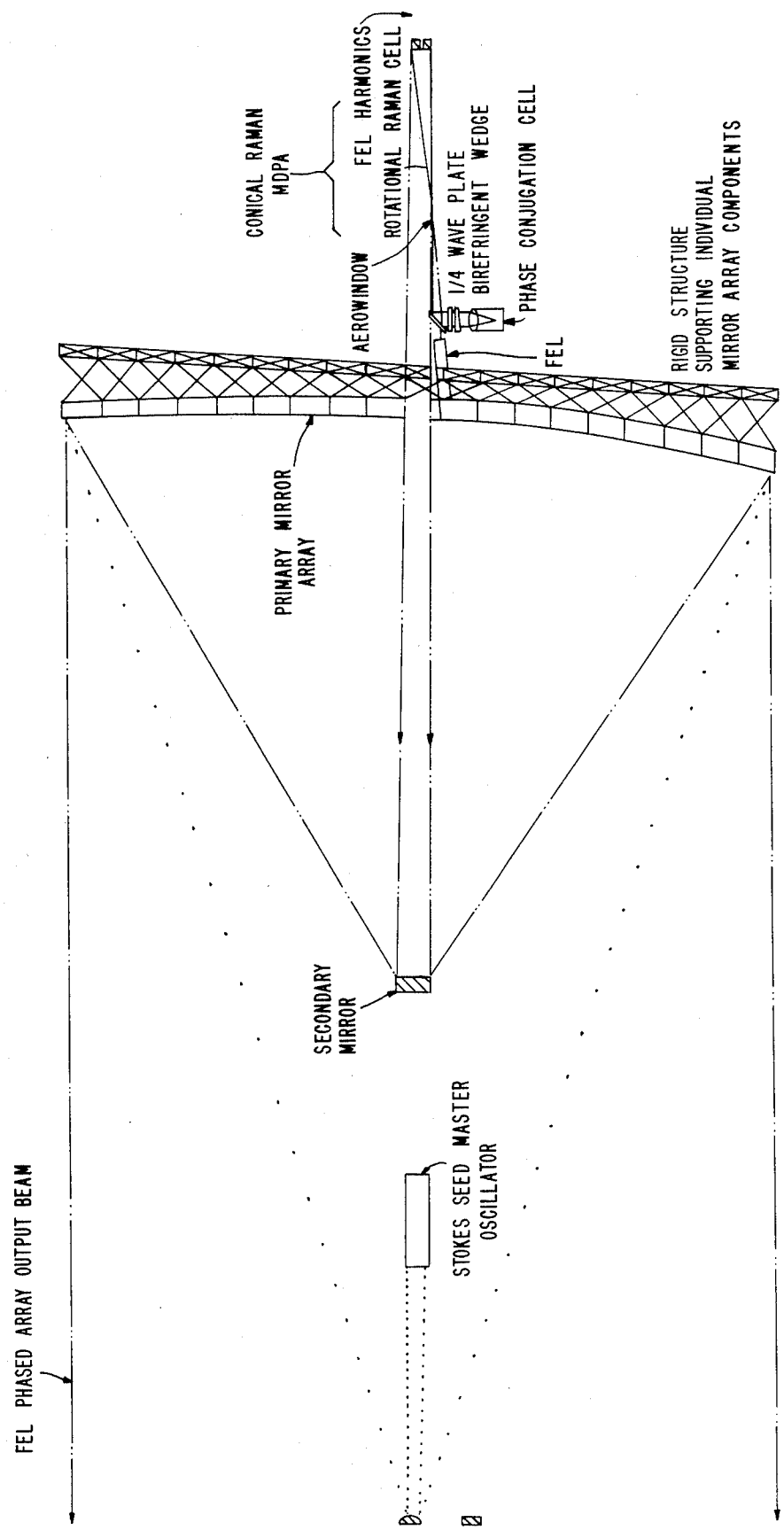
FIG. 6 is a schematic diagram similar to FIG. 5, but showing optical ray paths during the conversion output cycle.

The principles of Raman outcoupling and phase conjugation can be further extended, to a system having multiple free-electron laser beams that can be coherently coupled into a single composite beam. FIGS. 5 and 6 illustrate the principles of such a system, including a multi-element primary mirror array 50, and a secondary mirror 52. The system includes multiple free-electron lasers, only one of which is shown at 10', and multiple conical Raman amplifiers 12'. Only one of the latter is also shown. In the output cycle of operation, the FEL beam is introduced into the Raman amplifier 12' together with a return seed beam from a common phase conjugation cell 40, as will be discussed. A high-power diverging output beam is obtained from the Raman amplifier 12' and is reflected from a mirror 54 designed to scrape off the harmonic and other unwanted components of the output. Light reflected from the mirror 54 passes through an opening in the primary mirror array 50 and impinges on the secondary mirror 52, which is multi-faceted. Light reflects from the secondary mirror 52 to the elements of the primary mirror array 50, which reflects the multiple beams into a composite output beam 56. The various FELs and related components are arranged geometrically such that each high-power output beam impinges on the secondary mirror 52 and contributes to the composite output of the primary array 50.

The input cycle for the FEL array system requires some additional components, including a seed beam master oscillator 60, a spherical mirror 62, and a collimating mirror 64. A diffraction-limited seed beam is generated in the master oscillator 60 and is directed to the spherical mirror 62, which diverges the seed beam into sub-beams directed to the entire primary mirror array 50. The primary array reflects the seed sub-beams back to the collimating mirror 64, which recollimates the seed beam and transmits it past the secondary mirror, through the opening in the primary mirror array, onto the mirror 54, then into the phase conjugation cell 40, through appropriate optical elements, such as a mirror, quarter-wave plate, and birefringent wedge. The seed beam arriving at the phase conjugation cell 40 now contains phase aberration information concerning the individual mirror elements of the primary array and the entire optical path to be followed by each high-power beam.

In the output cycle, the multi-faceted secondary mirror 52 ensures that each mirror element of the primary array receives a pre-corrected beam that takes into account the piston errors and aberration errors associated with that particular mirror element.

Up to this point, the description of the invention has not specifically identified the type of free-electron lasers employed. This is consistent with the broad concept of the invention, which is not limited to a particular type of FEL laser, and may have application to high-power lasers of some other type. For completeness, however, the following discussion of FIGS. 7-12 provides more specific examples of FEL configurations that may employ the invention to advantage.

There are two principal types of FELs, the induction linear accelerator (LINAC) FEL and the radio-frequency (RF) LINAC FEL. Although these terms refer to the manner in which electrons are accelerated for use in the laser system, there are some important distinctions between the two types.

Figure 7:
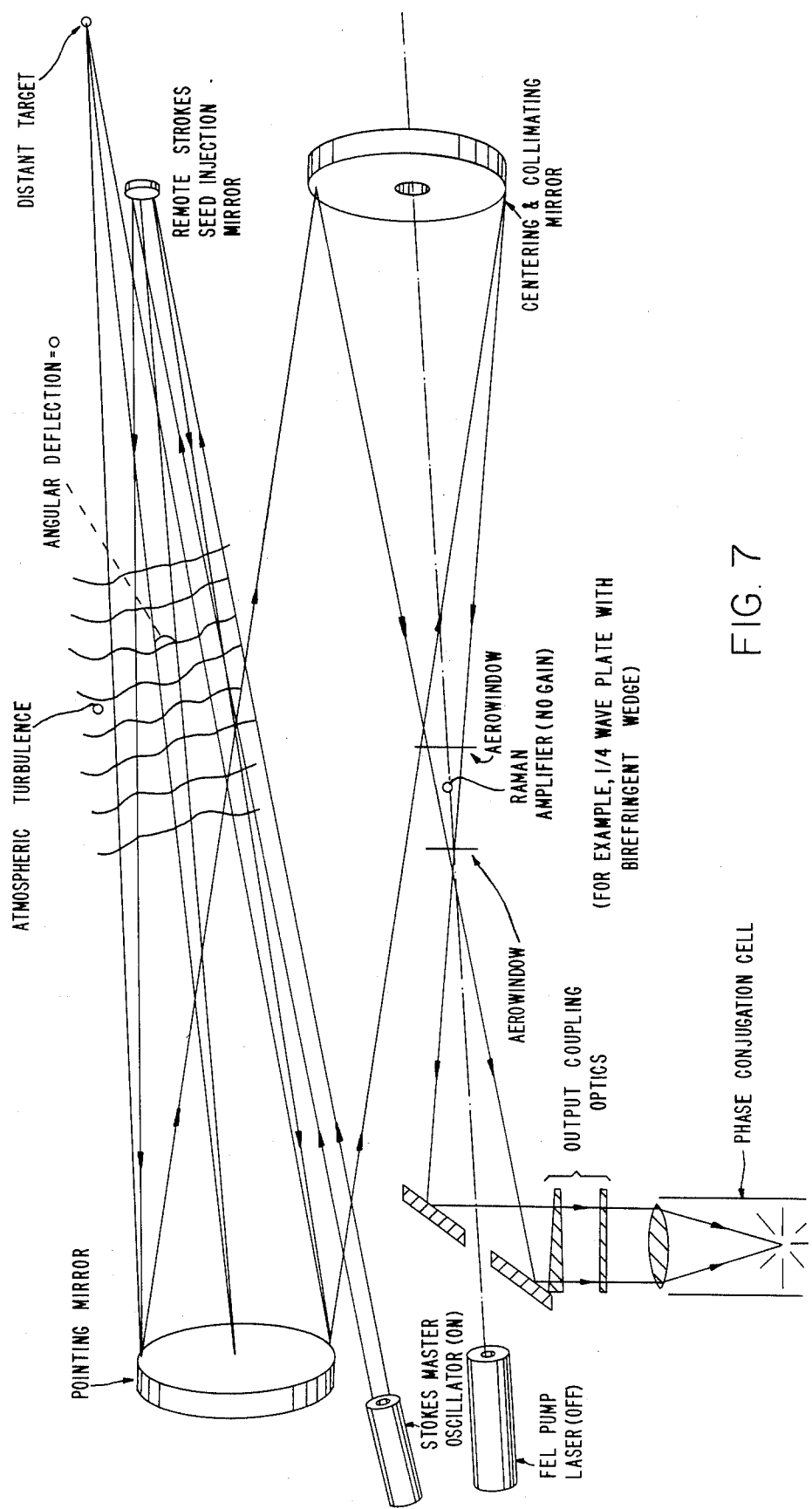
FIG. 7 is a schematic diagram of an induction linear accelerator (LINAC) free-electron laser system similar in principle to the one shown in FIG. 3, and showing the path of the input seed beam in more detail.

The induction LINAC FEL typically operates as a laser amplifier for a pulsed input beam with a pulse duration of approximately 50 nanoseconds (ns). FIGS. 6 and 7 illustrate an induction LINAC FEL system using the principles of the invention. The components are basically the same as those shown in FIGS. 3 and 4, and identical reference numerals have been used where appropriate. In this configuration, however, the collimating mirror 14' is tilted with respect to the axis of the beam emerging from the laser 10', such that the high-power beam 20' will be reflected away from the Raman amplifier apparatus and toward a pointing mirror 70, and reflected from there toward a target. Located in the same general direction as the target is a remote Stokes seed injection mirror 72. In the input cycle, a Stokes seed master oscillator, indicated at 74, directs a beam toward the injection mirror 72. In the illustration, the target and the injection mirror are assumed to be above the atmosphere, which constitutes a random source of wavefront aberration to light transmitted through it. The seed beam from the injection mirror 72 passes through the turbulent atmosphere to the pointing mirror 70, and from there to the collimating mirror 14'. From the collimating mirror, the seed beam passes through the quiescent Raman amplifier and is reflected by the mirror 46 into the phase conjugation cell 40, as discussed in relation to FIG. 3.

In the output cycle (FIG. 8), the Stokes master oscillator 74 is turned off and the FEL pump laser 10' is turned on. A pulse from the laser reaches the Raman amplifier 12' at the same time as the return seed beam from the phase conjugation cell 40, and the resulting output beam has all of the spectral, shape and phase characteristics as the seed beam. Accordingly, the output high-power beam is pre-corrected for aberrations introduced by atmospheric turbulence and by the design or uncontrollable movement of the optical components The RF LINAC FEL behaves like a laser oscillator in many of its possible configurations, i.e. the wiggler of the FEL is placed inside an optical resonator to provide optical regeneration. Care must be taken when using an intracavity non-linear outcoupling scheme, such as the Raman amplifier used in the present invention, to outcouple an appropriate proportion of the laser energy. Excessive outcoupling will affect the stability of the laser oscillation within the cavity. Too little outcoupling, on the other hand, will allow the FEL resonator to exceed the damage limits of the optical system. Fortunately, the Raman amplifier permits control of the amount of power outcoupled from the FEL cavity. Two examples of the RF LINAC FEL are illustrated: the ring resonator and the confocal resonator.

Figure 8:
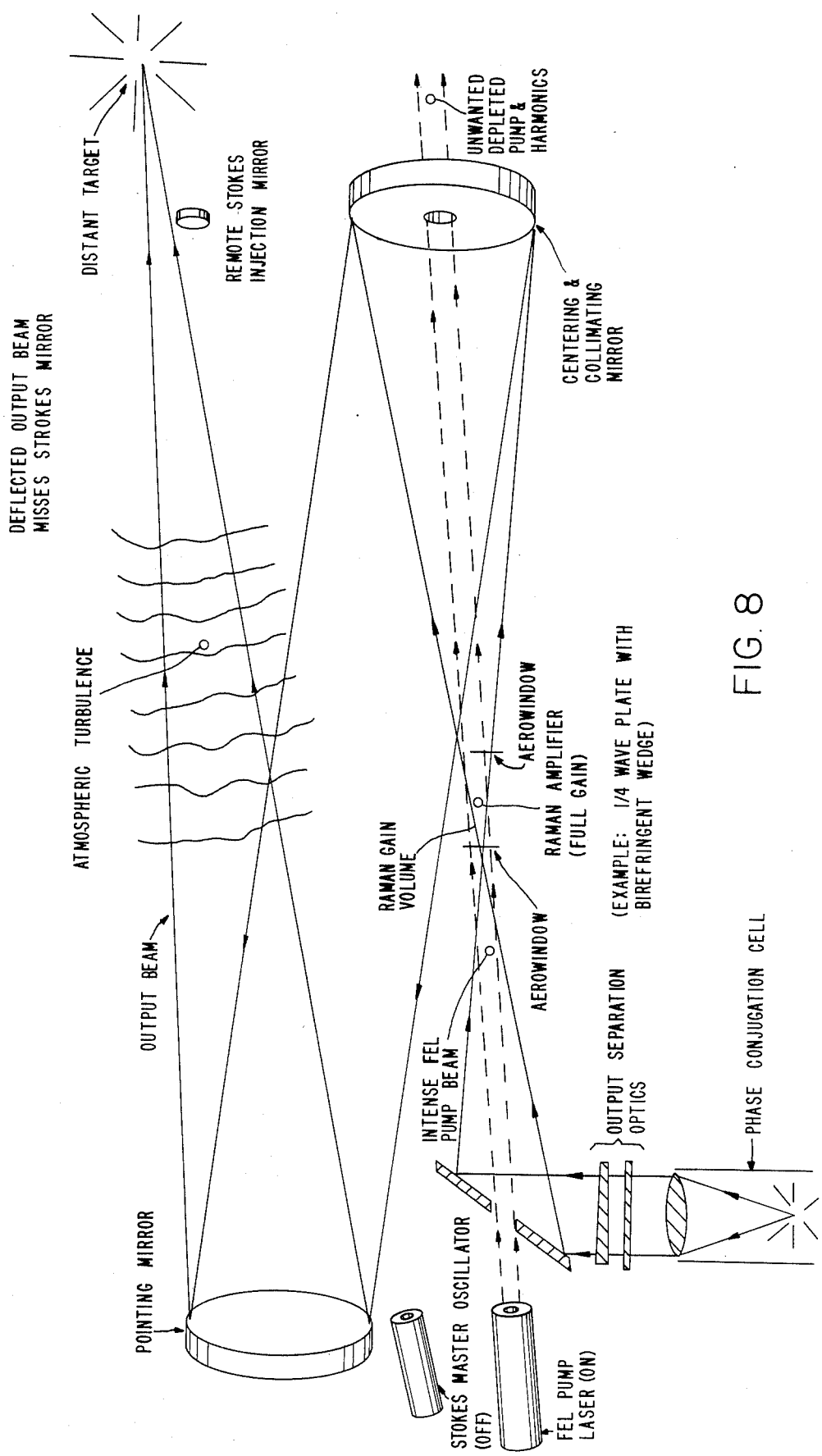
FIG. 8 is a schematic diagram similar to FIG. 7, but showing optical ray paths during a conversion output cycle.
Figure 9:
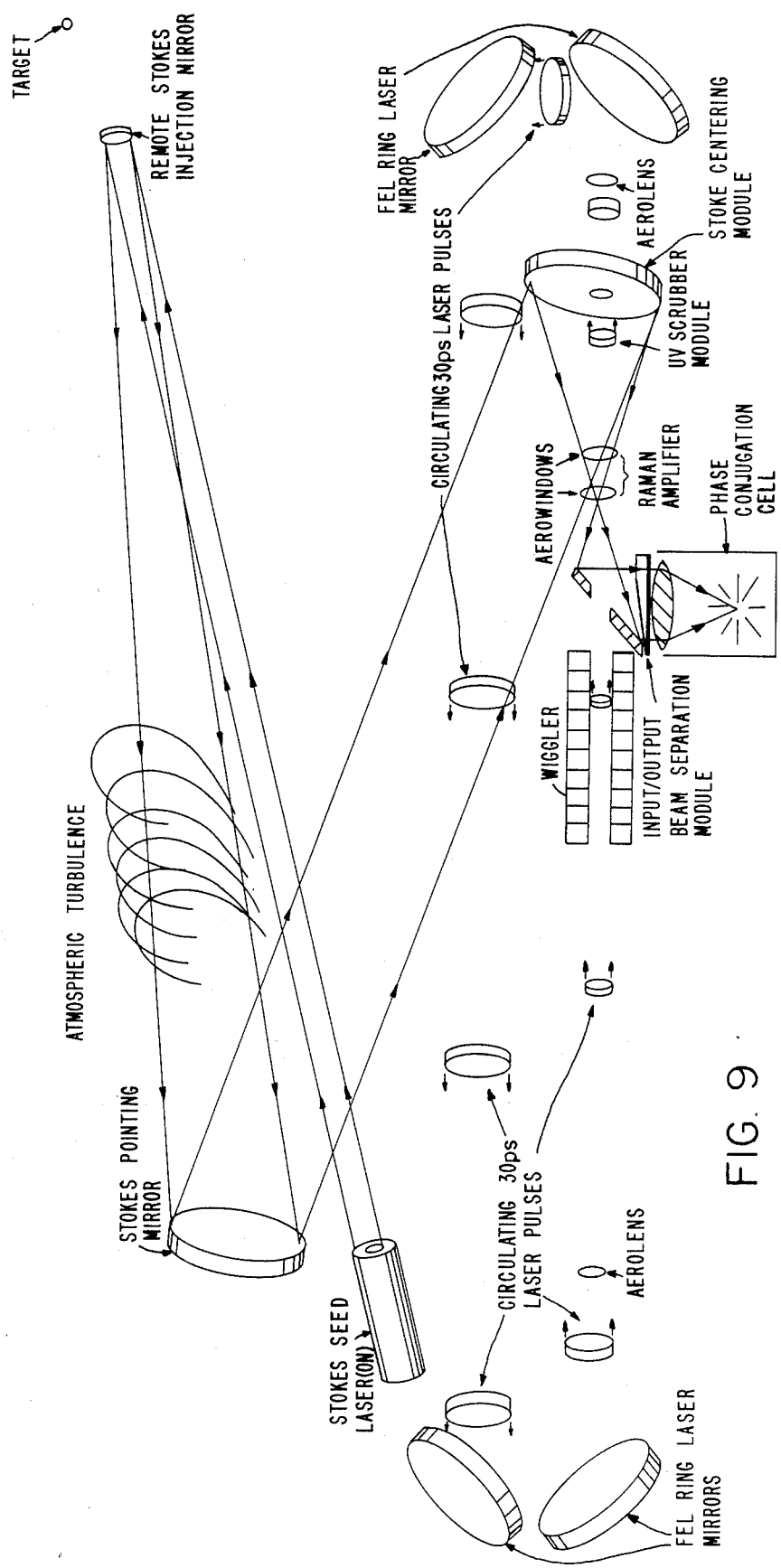
FIG. 9 is a schematic diagram of a radio-frequency linear accelerator (RF LINAC) free electron laser system in accordance with the invention, including a ring resonator and showing the optical ray paths during a seed input cycle.
Figure 10:
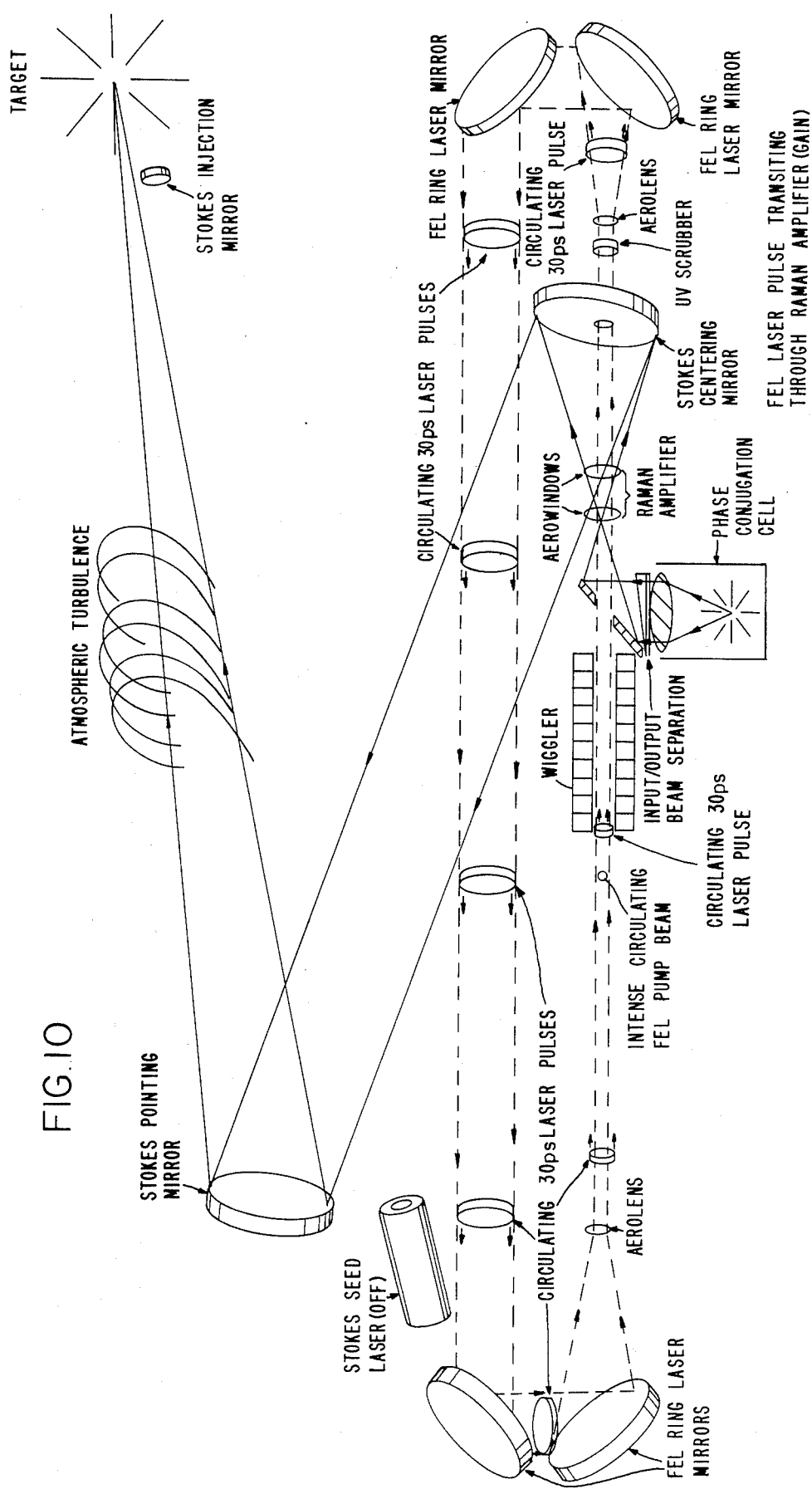
FIG. 10 is a schematic diagram similar to FIG. 9, but showing optical ray paths during a conversion output cycle.

FIGS. 9 and 10 show one configuration of an RF LINAC FEL employing the principles of the invention. Many of the components have the same function as similar components shown in FIGS. 7 and 8, and the same reference numerals are used where appropriate. The principal difference, of course, is that the FEL output beam, indicated at 18, must be reflected back through the FEL wiggler by some means, as well as having some of its energy outcoupled by the Raman amplifier 12'. By appropriate selection of the amplifier parameters, particularly the gain, only a portion of the FEL beam power will be converted to an expanded beam by the amplifier, and reflected by the mirrors 14' and the pointing mirror 70 to the target. A remaining portion of the FEL beam energy will pass through aperture of the mirror 14' and it is this portion that will be recirculated through the FEL.

Recirculation of the high-power poses the usual problem of how to reflect the beam with solid material optical elements. The solution presented by this embodiment of the invention is to employ an aerolens 80 to enlarge the beam and thereby reduce its intensity; then to employ a series of four mirrors 82–85 in a ring configuration to reflect the beam through a full three hundred and sixty degrees. A second aerolens 86 reduces the diameter of the beam again for reintroduction into the FEL wiggler. Each aerolens includes layers of gases flowing perpendicularly to the optical beam and providing varying refractive indexes, which, if properly selected, result in the enlargement or reduction of the beam diameter, and permit construction of the system without the need for an unusually long resonator. Also included in the ring-like optical path traversed by the high-power beam is an ultraviolet "scrubber" 88, which may include another Raman amplifier configured to separate out the ultraviolet frequencies.

Beam wavefront correction by phase conjugation takes place in the manner described in connection with FIGS. 7 and 8. A Stokes seed beam or probe beam is passed through the atmosphere and the various optical components during an input cycle, and is reflected from the phase conjugation cell and into the Raman amplifier at the precise instant that an intense pulse reaches the amplifier from the FEL. Therefore, the pulsed beam emitted from the Raman amplifier contains pre-corrections for aberrations to be encountered by the output beam in the atmosphere or in the optical components.

Figure 11:
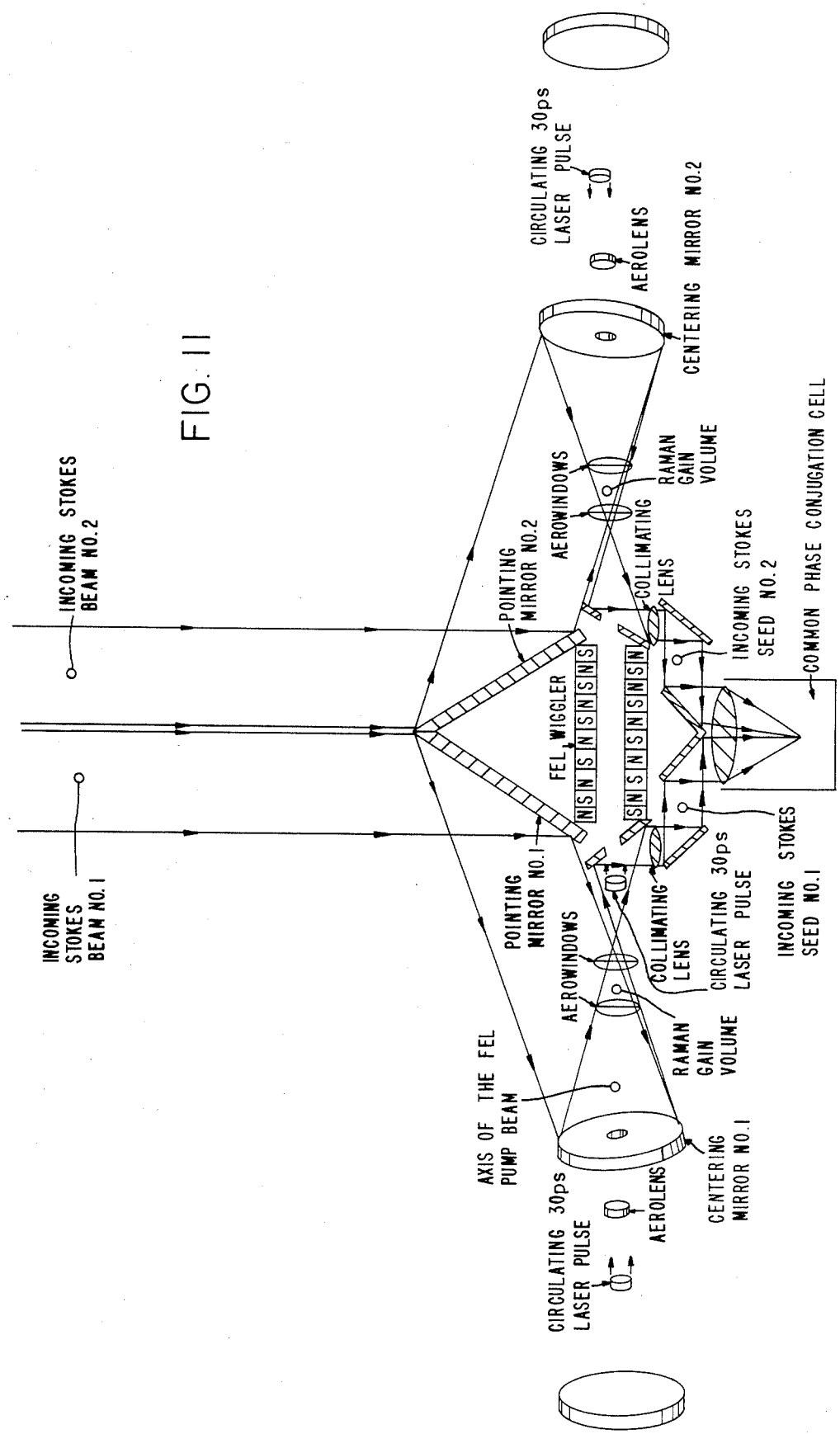
FIG. 11 is a schematic diagram of a radio-frequency linear accelerator (RF LINAC) free-electron laser system in accordance with the invention, including a confocal resonator and showing the optical ray paths during a seed input cycle.
Figure 12:
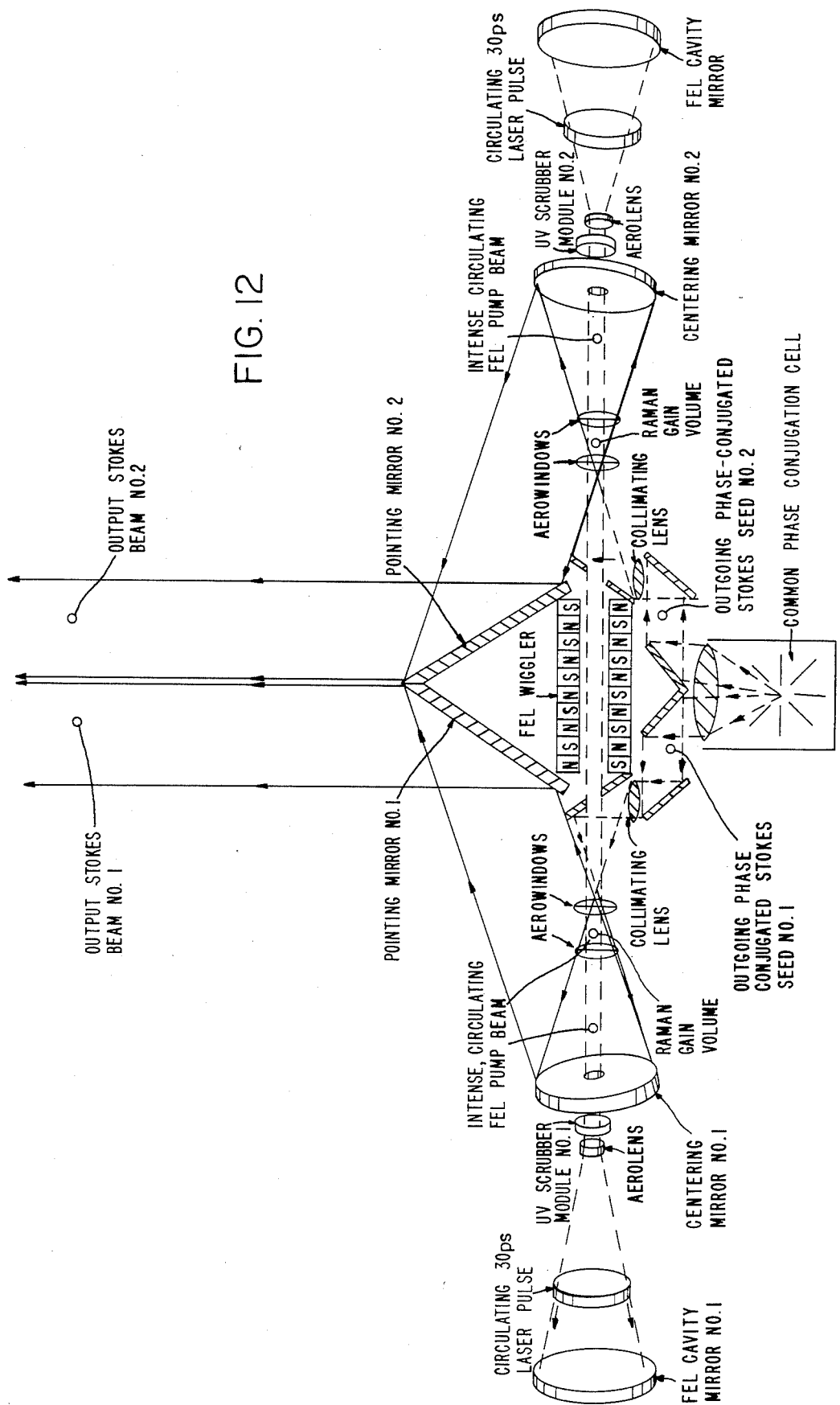
FIG. 12 is a schematic diagram similar to FIG. 11, but showing optical ray paths during a conversion output cycle.

An alternative to the ring resonator design is the confocal configuration of FIGS. 11 and 12. Basically, this configuration involves the duplication of many of the elements in FIGS. 9 and 10, with duplicate components being arranged at opposite ends of the FEL wiggler. There are two Raman amplifiers 12', two mirrors 14', and two pointing mirrors 70. In the input cycle, two incoming Stokes beams are parallel and adjacent as they impinge on the two pointing mirrors 70 and reflect the beams to the two respective collimating mirrors 14'. The incoming Stokes beams pass through the quiescent Raman amplifiers 12', reflect from the annular mirrors 46, then reflect from a series of mirrors 90 positioned to direct both incoming Stokes beams into the single phase conjugation cell 40. The quarter-wave plate and birefringent wedge have been omitted in FIGS. 11 and 12, but these elements, or something functionally equivalent, would be needed to separate the paths of the incoming Stokes beam and the outgoing power beam.

As in previously described embodiments, the return phase-conjugated beams will reach the respective Raman amplifiers at the same time as one of an ongoing series of pulses from the FEL. Thus each Raman amplifier will generate an amplified output of the desired spectral, shape and phase content. As in the case of the ring resonator, appropriate selection of the amplifier gain will result in outcoupling only a desired portion of the laser power. The remainder will propagate through the Raman amplifiers as a small-diameter beam, which is enlarged by aerolenses 80 and 86, and then reflected by plane mirrors 92 and 94, respectively. On the return pass from the mirrors 92, 94, laser pulses are reduced in diameter by the same aerolenses 80, 86, and recirculated through the wiggler.

This arrangement permits *bidirectional* Raman coupling and requires that the two Raman amplifiers be placed on the FEL optical axis in location such that counter-propagating FEL pump pulses arrive in the Raman amplifiers simultaneously when the phase-conjugated Stokes are injected. In each case, the input Stokes seed and the corresponding FEL pump pulse propagate in the *same* direction.

Figure 13:
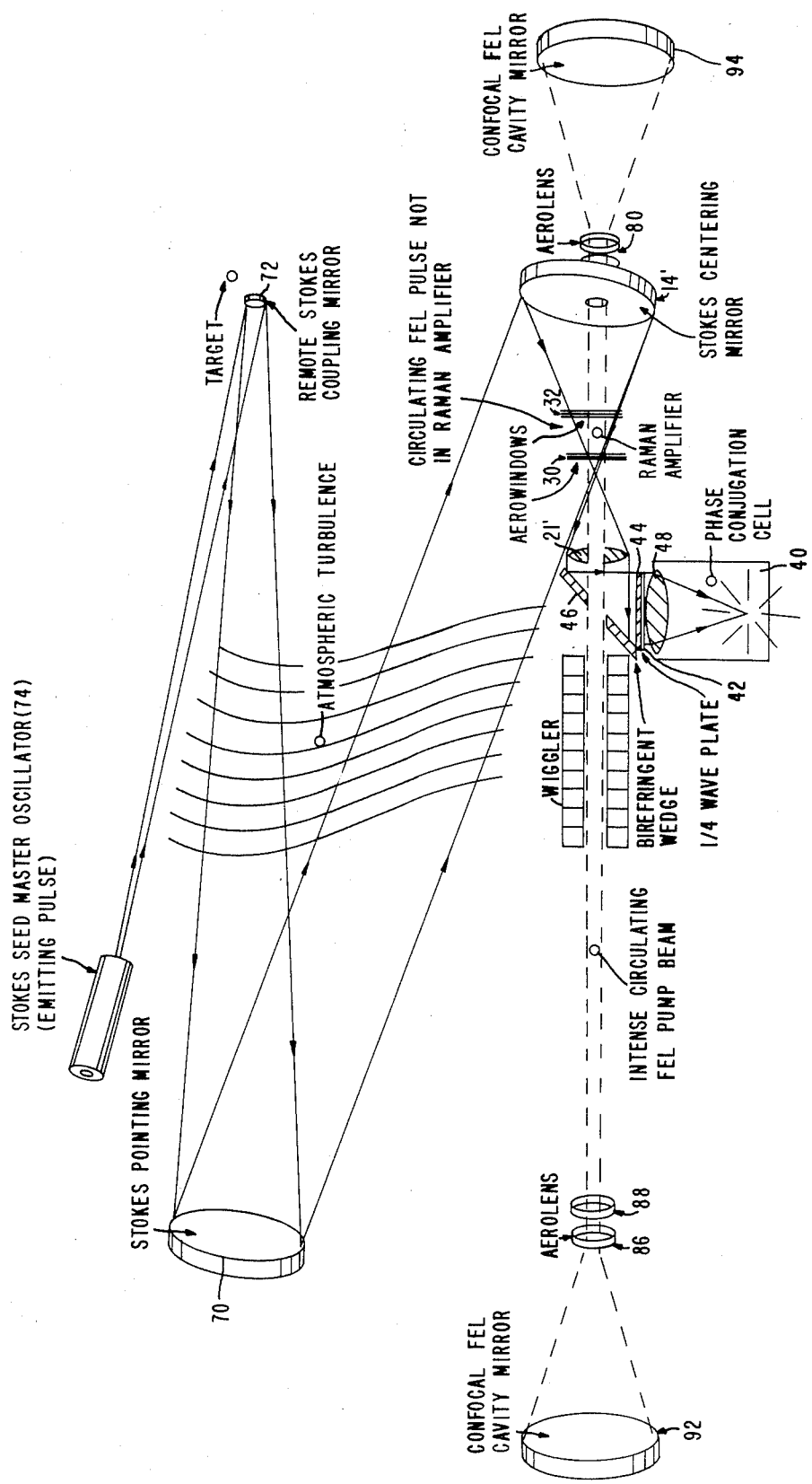
FIG. 13 is a schematic diagram of a confocal RF LINAC FEL employing a unidirectional Raman outcoupler, and showing the optical ray paths during a seed input cycle.
Figure 14:
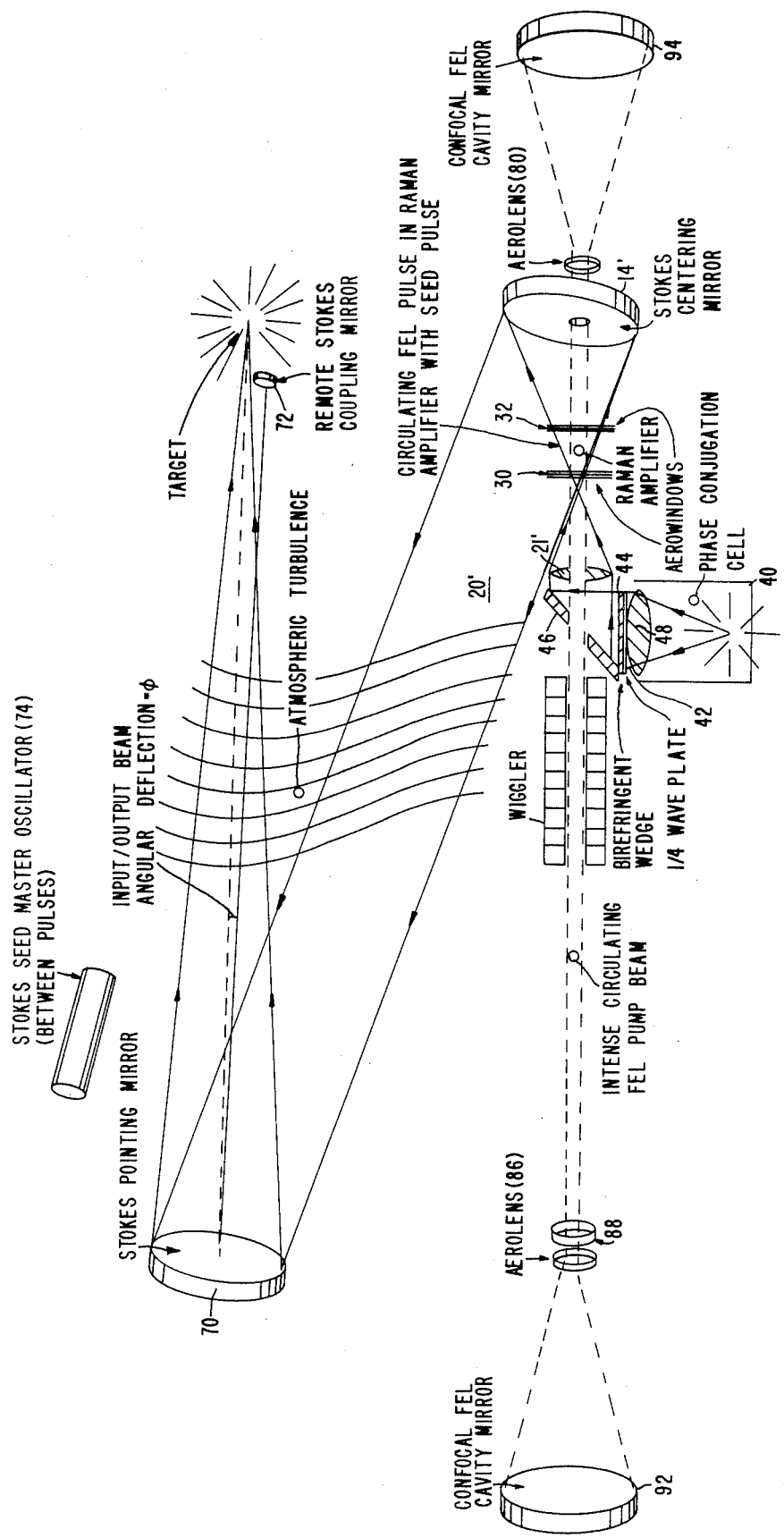
FIG. 14 is a schematic diagram similar to FIG. 13, but showing optical ray paths during a conversion output cycle.

Input and output pulse schematics for a *unidirectional* conical Raman outcoupler applied to a confocal RF LINAC FEL are shown in FIGS. 13 and 14. Output pulses from the phase conjugation cell are timed to enter the Raman amplifier simultaneously with co-propagating pulses regenerating in the confocal FEL cavity. Power is extracted from the circulating optical pulses only for light propagating in the gain direction through the wiggler. Stable extraction is achieved when the Stokes output power equals the power increase generated by the wiggler gain times the quantum efficiency of the Raman transition.

Another significant difference between the induction LINAC FEL and the RF LINAC FEL is the pulse duration. Typical induction LINAC FELs produce optical pulses of approximately 50 ns (or $5\times 10^{-8}$ second) whereas RF LINAC FELs produce pulses as short as 10 ps (or $10^{-11}$ second) duration. The optical gain associated with stimulated Raman scattering depends upon the pulse duration of the pump pulse if the pump pulse length is less that the phonon decay time associated with the Raman scattering process. In the preferred form of the invention, in which low pressure hydrogen gas is used as Raman active medium, short pumping pulses (of 10 ps or greater) from a RF LINAC FEL would produce much lower optical gain than the 50 ns pulses from an induction LINAC FEL at the same pump intensity using the same Raman amplifier, and thus the product of the hydrogen pressure and the seed/pump beam interaction length would need to be proportionately increased for the RF LINAC FEL to compensate for the deleterious effects of operating in the transient Raman gain regime.

It will be appreciated from the foregoing that the present invention represents a significant advance in the field of free-electron lasers. In particular, the invention provides a technique for outcoupling energy from a very intense beam without using diffraction to enlarge the beam diameter. Moreover, the outcoupling technique can be easily adapted to employ phase correction of very high-power beams using phase conjugation. Phase correction can be applied to both induction LINAC FELs and to RF LINAC FELs, to correct for phase distortions arising from atmospheric aberrations or from various types of distortions introduced by optical equipment. It will also be appreciated that, although a number of embodiments of the invention have been described in detail for purposes of illustration, various modifications may be made without departing from the spirit and scope of the invention. Accordingly, the invention is not to be limited except as by the appended claims.

I claim:

1. A free-electron laser system, comprising:
   a free-electron laser pump beam generator producing a high-power optical output beam in a vacuum environment;
   a Raman amplifier cell located in the path of the output beam from the pump beam generator;
   means for generating and introducing a Stokes seed beam into the Raman amplifier cell, the seed beam having divergent properties within the cell and having a desired cross-sectional shape and spectral content, wherein the Raman amplifier amplifies the seed beam and generates a high-power output beam of generally the same shape, divergence, phase and spectral content as the seed beam, and wherein unwanted spectral components are unaffected by the amplifier and are closely confined to the pump beam axis;
   a pair of gaseous windows through which the output beam enters and leaves the Raman amplifier cell, each window having a stream of gas moving continuously in a direction generally perpendicular to the beam; and
   a mirror positioned in the path of the output beam from the Raman amplifier, the mirror functioning to reflect and further direct the output beam, but not the unwanted spectral components.

2. A free-electron laser system as defined in claim 1, wherein the means for introducing a Stokes seed beam includes:
   a seed beam laser oscillator; and
   a Stokes seed beam focusing system, for producing a seed beam for introduction into the Raman amplifier cell.

3. A free-electron laser system as defined in claim 2, wherein:
   the Stokes seed beam focusing system is of annular configuration, to produce an annular converging seed beam, which becomes a diverging seed beam within the Raman amplifier cell.

4. A free-electron laser system as defined in claim 2, wherein:
   the free-electron laser is operated in a pulsed mode; and
   the means for introducing the Stokes seed beam includes means operative in an input cycle, when the laser is quiescent, for phase conjugating the seed beam and introducing it into the Raman amplifier at the very end of the input cycle, wherein the seed beam and the laser output beam are together introduced into the Raman amplifier at the start of an output cycle.

5. A free-electron laser system as defined in claim 4, wherein the means for introducing the Stokes seed beam further includes:
   optical means for directing the seed beam, during the input cycle, from the seed beam laser oscillator along substantially the same path as the high-power beam follows in the output cycle;
   optical means for focusing the seed beam into the means for phase conjugating the beam, thereby producing a return seed beam; and
   means for effecting an offset in the path of the return seed beam, such that the high-power output beam does not exactly correspond to the path of the input seed beam.

6. A free-electron laser system, comprising:
   a free-electron laser pump beam generator producing a high-power optical output beam in a vacuum environment during an output cycle of operation;
   a Raman amplifier cell located in the path of the output beam from the pump beam generator;
   a master oscillator for generating a Stokes input seed beam that will be used to define the properties of a high-power output beam;
   first optical means operable only during an input cycle, for transmitting the input seed beam over a path that conforms substantially with the intended path of the high-power output beam;
   a phase conjugation cell;
   second optical means, for directing the input seed beam into the phase conjugation cell, for generation of a return seed beam containing phase corrections necessary to compensate for any aberrations encountered in the path of the high-power output beam, wherein the return seed beam and the output beam from the laser both enter the Raman amplifier cell at the same time and produce the high-power output beam, having the same divergence, shape, and phase properties as the return seed beam, and therefore having pre-corrected wavefronts for compensation of any aberrations that will be introduced by optical elements and transmission media encountered by the high-power beam;
   third optical means for deflecting an expanded high-power beam along its intended path, including means for separating out any unwanted spectral components of the laser output; and
   a pair of gaseous windows through which the output beam enters and leaves the Raman amplifier cell, each window having a stream of gas moving continuously in a direction generally perpendicular to the beam.

7. A free-electron laser system as defined in claim 6, wherein:
   the means for separating out unwanted spectral components includes a mirror having a central aperture through which the unwanted components pass in the output cycle, since the seed beam is selected not to include the unwanted spectral components.

8. A free-electron laser system as defined in claim 7, wherein the third optical means includes:
   a quarter-wave plate and a birefringent wedge disposed in the path of the input and return seed beams, to effect a desired deflection of the return seed beam with respect to the input seed beam.

9. A free-electron laser as defined in claim 6, wherein:
   the Raman amplifier cell is located within the free-electron laser cavity and provides an output beam of only a portion of the power of the beam input to the amplifier from the free-electron laser, leaving another portion for recirculation through the laser; and
   the system further includes means for recirculating part of the laser output.

10. A free-electron laser system as defined in claim 9, wherein:
    the means for recirculating part of the laser output includes multiple mirrors arranged in a ring configuration.

11. A free-electron laser system as defined in claim 10, wherein:
    the means for recirculating part of the laser output further includes a gaseous lens for expanding the beam to provide an intensity low enough to avoid damage to the multiple mirrors.

12. A free-electron laser system as defined in claim 11, wherein:
the means for recirculating part of the laser output further includes a second gaseous lens for reducing the beam diameter for reintroduction into the laser.

13. A free-electron laser system as defined in claim 9, wherein:
the means for recirculating part of the laser output includes two opposed mirrors located at opposite ends of the laser, and two gaseous lenses disposed in the path of the laser beam, to expand its diameter sufficiently to avoid damage to the two mirrors; and
the system includes two Raman amplifier cells located at opposite ends of the laser, and duplicate third optical means for producing two Raman amplifier output beams for combination into a single output.

14. A free-electron laser system for combining the outputs of multiple free-electron lasers, the system comprising:
a plurality of free-electron lasers, each of which simultaneously produces a high-power laser beam during an output cycle of operation;
an equal plurality of Raman amplifier cells arranged to receive the respective laser outputs;
an equal plurality of mirrors arranged in a primary mirror array;
a master seed beam oscillator, for producing during an input cycle of operations a low-power input seed beam to control operation of the Raman amplifier cells;
first optical means, for splitting the input seed beam into an equal plurality of sub-beams and for directing the input seed beam and sub-beams, during input cycles, along substantially the same paths that high-power output beams follow during output cycles;
a common phase conjugation cell, into which all of the input seed sub-beams are directed, and from which is generated a plurality of return seed beams containing phase error information for pre-correction of phase errors in the paths of the output beams, wherein the return seed beams are timed to arrive at respective Raman amplifier cells at the same time as laser output beams from the respective free-electron lasers;
second optical means, for directing multiple Raman output beams having phase correction information and appropriate divergence, onto the primary mirror array for reflection to a target; and
means for producing an angular directional shift between the input seed sub-beams and the return seed sub-beams, to ensure that the high-power output beams will not follow the input seed beam path exactly;
wherein the common phase conjugation cell ensures phase coherency of the combined output beams and corrects for aberrations due to optical elements and the transmission medium.

15. A free-electron laser system as defined in claim 14, wherein the first optical means includes:
a spherical mirror for diverging the input seed beam into sub-beams directed at the primary mirror array elements;
a collimating mirror for receiving input seed sub-beams from the primary mirror array; and
focusing optics for directing the input seed sub-beams into the phase conjugation cell.

16. A free-electron laser system as defined in claim 14, wherein the second optical means includes:
a faceted secondary mirror located to receive the outputs from the Raman amplifier cells and to reflect them to respective ones of the primary mirror array elements.

17. A method for outcoupling a beam from a high-power laser, comprising the steps of:
placing a Raman amplifier in the path of the output from the laser;
injecting into the Raman amplifier a low-power converging seed beam having a desired degree of divergence after it enters the amplifier, and having a desired spectral and phase content;
generating in the Raman amplifier a high-power output beam having identical divergence, spectral and phase characteristics to the input seed beam;
directing the high-power output beam onto a mirror designed to withstand the intensity of the beam, whereby the diverging beam has a lower intensity than the laser output.

18. A method as defined in claim 17, and further including the steps of:
controlling the phase of the input seed beam to correct for aberrations detected in the path of the high-power output beam.

19. A method as defined in claim 18, wherein the step of controlling the phase of the input seed beam includes:
transmitting the input seed beam over substantially the same path that will be followed by the high-power output beam;
focusing the input seed beam into a phase conjugation cell;
producing a phase conjugate return seed beam in the phase conjugation cell; and
timing operations of the system to provide for simultaneous arrival in the Raman amplifier of the phase conjugate return seed beam and the output beam from the high-power laser.

20. A method as defined in claim 19, and further comprising the steps of:
placing additional Raman amplifiers in the paths of the outputs from additional high-power lasers;
injecting into each additional Raman amplifier a low-power converging seed beam derived from the same source as the first-defined seed beam;
generating in each additional Raman amplifier a high-power output beam having identical divergence, spectral and phase characteristics to the input seed beam; and
directing the additional high-power output beams onto mirrors forming a primary mirror array;
wherein the multiple high-power output beams from the primary mirror array are combined coherently into a single composite beam, and wherein the seed beams are transmitted over practically the same paths as corresponding high-power beams, and are focused into the same phase conjugation cell.

21. A method for coherently combining multiple outputs from a plurality of free-electron lasers (FELs), comprising the steps of:
generating a master seed beam to be used to control the characteristics of a plurality of FEL beams;

generating a plurality of seed sub-beams from the master seed beam;

transmitting the seed sub-beams through substantially the same optical paths that will be followed by correspsonding high-power output beams;

focusing the seed sub-beams into a single phase conjugation cell;

generating corresponding return seed sub-beams in the phase conjugation cell;

directing the return seed sub-beams into a plurality of Raman amplifiers;

generating an equal plurality of FEL beams timed to enter the corresponding Raman amplifiers at the same time as the return seed sub-beams;

generating in the Raman amplifiers an equal plurality of high-power output beams, each of which conforms to the spectral, divergence and phase characteristics of the corresponding return seed sub-beams; and reflecting the high-power output beams from a primary mirror array to combine the output beams into a single phase-coherent output beam.

* * * * *